US 6,552,105 B2

(12) United States Patent
Braat et al.

(10) Patent No.: US 6,552,105 B2
(45) Date of Patent: Apr. 22, 2003

(54) POLY (ARYLENE ETHER) COMPOSITION, METHOD FOR THE PREPARATION THEREOF, AND ARTICLES DERIVED THEREFROM

(75) Inventors: Adrianus J. F. M. Braat, Roosendaal (NL); Amy Rene Freshour, Putte (NL); Hua Guo, Selkirk, NY (US); Rene de Jongh, Bergen op Zoom (NL); Juraj Liska, Zilina-Zavodie Slovakia (SK)

(73) Assignee: General Electric Company, Pittsfield, MA (US)

( * ) Notice: Subject to any disclaimer, the term of this patent is extended or adjusted under 35 U.S.C. 154(b) by 131 days.

(21) Appl. No.: 09/782,584

(22) Filed: Feb. 13, 2001

(65) Prior Publication Data

US 2001/0036981 A1 Nov. 1, 2001

Related U.S. Application Data

(60) Provisional application No. 60/182,613, filed on Feb. 15, 2000.

(51) Int. Cl.⁷ .............................................. C08L 95/00
(52) U.S. Cl. .......................................... 524/68; 524/59
(58) Field of Search ...................................... 524/59, 68

(56) References Cited

U.S. PATENT DOCUMENTS

| | | | |
|---|---|---|---|
| 3,219,625 A | | 11/1965 | Blanchard et al. |
| 3,306,875 A | | 2/1967 | Hay |
| 4,028,341 A | | 6/1977 | Hay |
| 4,092,294 A | | 5/1978 | Bennett, Jr. et al. |
| 4,440,923 A | | 4/1984 | Bartmann et al. |
| 4,818,367 A | | 4/1989 | Winkler |
| 4,994,508 A | | 2/1991 | Shiraki et al. |
| 5,280,064 A | | 1/1994 | Hesp et al. |
| 5,719,215 A | | 2/1998 | Liang et al. |
| 5,750,622 A | * | 5/1998 | Himes |
| 5,922,815 A | | 7/1999 | Aycock et al. |
| 5,959,007 A | | 9/1999 | Liang |
| 6,100,317 A | | 8/2000 | Liang et al. |
| 6,174,939 B1 | | 1/2001 | Liang |

* cited by examiner

*Primary Examiner*—Peter Szekely

(57) ABSTRACT

A composition comprises a bitumen and a poly(arylene ether) having an intrinsic viscosity less than 0.40 deciliters per gram. The composition exhibits high softening and flow temperatures, and high hardness.

29 Claims, No Drawings

POLY (ARYLENE ETHER) COMPOSITION, METHOD FOR THE PREPARATION THEREOF, AND ARTICLES DERIVED THEREFROM

CROSS REFERENCE TO RELATED APPLICATIONS

This application claims the benefit of U.S. Provisional Application Serial No. 60/182,613, filed Feb. 15, 2000.

BACKGROUND OF THE INVENTION

Bitumen compositions are widely used in the construction industry as adhesives, waterproofing agents, and preservatives. Bitumen compositions modified by certain thermoplastics and elastomers are known. For example, U.S. Pat. No. 4,818,367 to Winkler describes an asphalt composition containing an asphalt, a copolymer of an olefin with an anhydride or a nitrile, and an unsaturated elastomer having at least two terminal groups each with an active hydrogen, a halogen, an epoxy oxygen or a cyanocarbon. U.S. Pat. No. 5,280,064 to Hesp et al. describes compositions prepared by vulcanization of a bitumen and an amine-terminated poly (butadiene-co-acrylonitrile), followed by coupling of this vulcanization product with carboxylated polyethylene. U.S. Pat. No. 5,719,215 to Liang et al. and U.S. Pat. No. 5,959,007 to Liang describe compositions comprising bitumen and treated rubbers derived from automobile tires. U.S. Pat. No. 6,100,317 to Liang et al. describes compositions comprising bitumen, a sterically stabilized polyolefin, and another polymer, such as a styrene-butadiene-styrene copolymer, an ethylene-vinyl acetate copolymer, or an EPDM copolymer. U.S. Pat. No. 6,174,939 to Liang describes compositions comprising bitumen, a styrenic polymer, and a triblock copolymer as a compatibilizing agent.

BRIEF SUMMARY OF THE INVENTION

One embodiment of the invention is a composition comprising: a poly(arylene ether) having an intrinsic viscosity less than 0.4 deciliters/gram at 25° C. in chloroform; and a bitumen.

Another embodiment of the invention is a composition comprising the reaction product of: a poly(arylene ether) having an intrinsic viscosity less than 0.4 deciliters/gram at 25° C. in chloroform; and a bitumen.

Another embodiment of the invention is an article comprising either of the above compositions.

Another embodiment of the invention is a method of preparing a composition, comprising: blending a poly (arylene ether) and a bitumen; wherein the poly(arylene ether) has an intrinsic viscosity less than 0.4 deciliters/gram at 25° C. in chloroform.

DETAILED DESCRIPTION OF THE PREFERRED EMBODIMENTS

One embodiment of the invention is a composition comprising: a poly(arylene ether) having an intrinsic viscosity less than 0.4 deciliters/gram at 25° C. in chloroform; and a bitumen.

The composition may comprise any conventional poly (arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula:

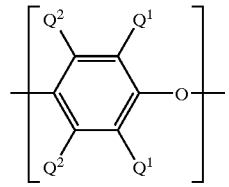

wherein for each structural unit, each $Q^1$ is independently halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_1$–$C_{12}$ halohydrocarbonoxy wherein at least two carbon atoms separate the halogen and oxygen atoms; and each $Q^2$ is independently hydrogen, halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_1$–$C_{12}$ halohydrocarbonoxy wherein at least two carbon atoms separate the halogen and oxygen atoms. Preferably, each $Q^1$ is independently $C_1$–$C_{12}$ alkyl or phenyl, especially $C_{1-4}$ alkyl, and each $Q^2$ is independently hydrogen or methyl.

Both homopolymer and copolymer poly(arylene ether)s are included. The preferred homopolymers are those comprising 2,6-dimethyl-1,4-phenylene ether units. Suitable copolymers include random copolymers comprising, for example, such units in combination with 2,3,6-trimethyl-1, 4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s may further include combinations of any of the above.

The poly(arylene ether) may have a number average molecular weight of about 500 to less than 20,000 atomic mass units (amu), preferably about 1,000 to about 10,000 amu, more preferably about 1,250 to about 9,000 amu. The poly(arylene ether) may have a weight average molecular weight of about 1,000 to less than 40,000 amu, preferably about 2,000 to about 30,000 amu, more preferably about 2,500 to about 20,000 amu. Both number and weight average molecular weights may be determined by gel permeation chromatography using polystyrene standards. The poly (arylene ether) may have an intrinsic viscosity less than 0.4 deciliters per gram (dl/g), preferably less than about 0.35 dl/g, more preferably less than about 0.30 dl/g, yet more preferably less than about 0.20 dl/g, as measured in chloroform at 25° C. The poly(arylene ether) may have an intrinsic viscosity greater than about 0.05 dl/g, preferably greater than about 0.08 dl/g, as measured in chloroform at 25° C.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese, or cobalt compound, usually in combination with various other materials. Suitable methods for the preparation and isolation of poly(arylene ether)s are disclosed in, for example, U.S. Pat. No. 3,219,625 to Blanchard et al., U.S. Pat. No. 3,306,875 to Hay, U.S. Pat. No. 4,028,341 to Hay, U.S. Pat. No. 4,092,294 to Bennett, Jr. et al., U.S. Pat. No. 4,440,923 to Bartmann et al., and U.S. Pat. No. 5,922,815 to Aycock et al.

Preferred poly(arylene ether)s may have a low level of amine incorporation. Poly(arylene ether)s are often synthesized under conditions that result in incorporation of amine catalysts, such as dibutylamine, into the polymer. For example, when using dibutylamine (DBA) in the polymerization process, the amount of DBA incorporated into a high-intrinsic viscosity (e.g., 0.48 dL/g) poly(arylene ether) may be about 0.9–1.0 weight percent, calculated as 100 times the weight of incorporated dibutylamine divided by the total weight of the poly(arylene ether). In comparison, methods for synthesis of low-intrinsic viscosity poly(arylene ether) may result in lower incorporation of amine. For example, the level of dibutylamine incorporated into low molecular weight (e.g., 0.11 dL/g) poly(arylene ether) may be about 0.15 to about 0.28 weight percent. It is desirable to use poly(arylene ether) with low incorporated amine content to minimize the amount of amine that may become thermally liberated during subsequent processing and may adversely affect properties of the composition. For this reason, it is generally preferred that the poly(arylene ether) comprise less than about 0.5 weight percent of amine, preferably less than about 0.3 weight percent of amine, calculated as 100 times the weight of incorporated dibutylamine divided by the total weight of the poly(arylene ether). Method for determining the amine content of poly(arylene ether)s are known in the art and include, for example, titration of the poly(arylene ether) with perchloric acid in the presence of an indicator system comprising 1-naphthol and mercuric acetate.

The amount of poly(arylene ether) in the composition may vary widely and will depend on the ultimate use of the composition and the presence of other components. In general, the composition may comprise at least about 0.1 weight percent, preferably at least about 0.5 weight percent, more preferably at least about 1 weight percent, based on the total weight of the composition. The composition may comprise up to about 99 weight percent, preferably up to about 20 weight percent, more preferably up to about 10 weight percent, of the poly(arylene ether) based on the total weight of the composition.

Bitumen, as employed in the composition, refers to a class of black or dark-colored solid, semi-solid, or viscous cementitious substances, natural or manufactured, composed principally of high molecular weight hydrocarbons. A common source of bitumen is as a bi-product of petroleum refining. Materials comprising bitumen may include straight asphalt, semi-blown asphalt, blown asphalt, tar, pitch, cutback asphalt, asphalt emulsion, and the like.

Bitumen may be characterized by its penetration grade. Penetration grade is determined by a needle penetration test and expressed as the extent to which a needle penetrates a prepared sample. Penetration may be measured according to ASTM D5-97 (Standard Test Method for Penetration of Bituminous Materials). The results are reported in units of 0.1 millimeter (sometimes expressed without the millimeter dimension), with 0 being very hard and 300 being very soft. While selection of a particular penetration grade will depend on the ultimate use for the composition, penetration grades of about 150 to about 220 may be preferred. Bitumens may also be characterized by their level of asphaltenes. To improve the compatibility of the bitumen with the poly(arylene ether), it is preferred that the asphaltene content should be as low as possible, preferably less than 12 weight percent of the total bitumen. The asphaltene content of bitumen may be determined according to ASTM D6560 (Standard Test Method for Determination of Asphaltenes (Heptane Insolubles) in Crude Petroleum and Petroleum Products).

The composition may comprise at least about 1 weight percent, preferably at least about 50 weight percent, more preferably at least about 80 weight percent bitumen, based on the total weight of the composition. The composition may comprise up to about 99.9 weight percent, preferably up to about 99 weight percent, more preferably up to about 95 weight percent of the bitumen, based on the total weight of the composition.

The composition may, optionally, comprise a block copolymer of an alkenyl aromatic compound and a conjugated diene (hereinafter a "block copolymer"). The block copolymer is a copolymer comprising (A) at least one block derived from an alkenyl aromatic compound and (B) at least one block derived from a conjugated diene. The arrangement of blocks (A) and (B) includes a linear structure, a grafted structure, and a radial teleblock structure having a branched chain. The block copolymer includes materials in which the aliphatic unsaturated group content in the block (B) is reduced by hydrogenation.

Preferred of these structures are linear structures embracing diblock (A-B block), triblock (A-B-A block and B-A-B block), tetrablock (A-B-A-B block), and pentablock (A-B-A-B-A block and B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) is represented by formula:

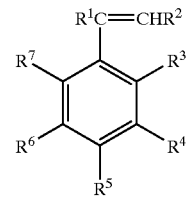

wherein $R^1$ and $R^2$ each independently represent a hydrogen atom, or a $C_1$–$C_8$ alkyl group; $R^3$ and $R^7$ each independently represent a hydrogen atom, a $C_1$–$C_8$ alkyl group, a chlorine atom, or a bromine atom; and $R^4$, $R^5$, and $R^6$ each independently represent a hydrogen atom, a $C_1$–$C_8$ alkyl group, or a $C_2$–$C_8$ alkenyl group, or $R^6$ and $R^7$ are taken together to form a naphthyl group, or $R^5$ and $R^6$ are taken together to form a naphthyl group.

Specific examples of the alkenyl aromatic compounds include styrene, p-methylstyrene, alpha-methylstyrene, vinylxylene, vinyltoluene, vinylnaphthalene, divinylbenzene, bromostyrene, and chlorostyrene, and combinations comprising at least one of the foregoing alkenyl aromatic compounds. Of these, styrene, alpha-methylstyrene, p-methylstyrene, vinyltoluene, and vinylxylene are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred conjugated dienes include 1,3-butadiene and 2-methyl-1,3-butadiene, with 1,3-butadiene being more preferred.

In addition to the conjugated diene, the block copolymer may contain a small proportion of a lower olefinic hydrocarbon, including, for example, ethylene, propylene, 1-butene, dicyclopentadiene, non-conjugated dienes, and the like.

In one embodiment, the block copolymer comprises alkenyl aromatic blocks having a total number average molecular weight of at least about 5,000 atomic mass units (amu), preferably at least about 10,000 amu, more preferably at least about 12,000 amu.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation with the remainder being 1,4-incorporation.

When the block copolymer is hydrogenated, it may be hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The block copolymer preferably has a number average molecular weight of about 5,000 to about 500,000 amu, more preferably about 10,000 to about 300,000 amu, yet more preferably about 30,000 to about 200,000 amu, and even more preferably about 45,000 to about 180,000 amu, as determined by gel permeation chromatography (GPC) using polystyrene standards.

The block copolymer may be prepared by known methods or obtained commercially. Suitable commercially available block copolymers include, for example, those materials available from Kraton Polymers under the trade name KRATON®. These materials include the unhydrogenated block copolymers in the KRATON® D series, such as, for example, the block poly(styrene-butadiene-styrene) materials KRATON® D1101, D1144X, D1184, and D1188; and the hydrogenated block copolymers in the KRATON® G series, such as, for example, the block poly(styrene-(ethylene-butylene)-styrene) materials KRATON® G1650 and G1652.

When present in the composition, the block copolymer may be used at greater than about 1 weight percent, preferably greater than about 2 weight percent, more preferably greater than about 5 weight percent, based on the total weight of the composition. The block copolymer may be used at less than about 30 weight percent, preferably less than about 20 weight percent, more preferably less than about 15 weight percent.

When the composition comprises a block copolymer of an alkenyl aromatic compound and a conjugated diene, the weight ratio of the block copolymer to the poly(arylene ether) may preferably be at least about 3:1, more preferably at least about 4:1.

The composition may, optionally, comprise one or more additives known in the art, including, for example, curing aids, activators, retarders, accelerators, processing aids, plasticizers, fillers, reinforcing agents, antioxidants, antiozonants, flame retardants, peptizing agents, coupling agents, gelling agents, and the like, and mixtures comprising at least one of the foregoing additives. Fillers that may be used in the composition include, for example, limestone, slate dust, talc, fly ash, carbon black, and the like, and mixtures comprising at least one of the foregoing fillers.

In one embodiment, the composition may comprise about 1 to about 3 weight percent of a poly(arylene ether) having an intrinsic viscosity less than 0.4 deciliters/gram at 25° C. in chloroform; about 5 to about 15 weight percent of a block copolymer of an alkenyl aromatic compound and a conjugated diene; and about 50 to about 94 weight percent bitumen; wherein all weight percents are based on the total weight of the composition.

In another embodiment, the composition may comprise about 1 to about 3 weight percent of a poly(arylene ether) comprising poly(2,6-dimethyl-1,4-phenylene ether) having an intrinsic viscosity less than 0.2 deciliters/gram at 25° C. in chloroform; about 5 to about 15 weight percent of block-poly(styrene-butadiene-styrene), block-poly(styrene-(ethylene-butylene)-styrene), or a mixture comprising at least one of the foregoing; and about 50 to about 94 weight percent bitumen; wherein all weight percents are based on the total weight of the composition.

In one embodiment, the composition may preferably exhibit a ring and ball softening point according to NEN-EN 1427 of at least about 85° C., more preferably at least about 90° C.

In one embodiment, the composition may preferably exhibit a penetration point according to NEN-EN 1426 less than about 0.55 mm, more preferably less than about 0.50 mm.

In one embodiment, the composition may preferably exhibit a flow temperature according to PrEN 1110 of at least about 70° C., preferably at least about 75° C.

The composition may be prepared by blending the poly(arylene ether) and the bitumen to form an intimate mixture. Blending is generally conducted at a temperature of at least about 180° C. Blending may also be conducted at a temperature of at least about 210° C. Blending may be facilitated by using a powdered form of the poly(arylene ether). Specifically, in one embodiment it is preferred to use a milled poly(arylene ether)s having an average particle size not greater than about 200 micrometers, more preferably not greater than about 100 micrometers, yet more preferably not greater than about 75 micrometers, even more preferably not greater than about 50 micrometers. In another embodiment, it may be preferably to use a powdered poly(arylene ether) having an average particle size of about 20 to about 200 micrometers. Powdered poly(arylene ether) materials may be prepared by grinding commercially available pellets using grinding techniques known in the art.

When the composition comprises a block copolymer of an alkenyl aromatic compound and a conjugated diene, it may be prepared by blending the poly(arylene ether) and the block copolymer to form a first intimate mixture; and blending the first intimate mixture and bitumen to form a second intimate mixture.

The composition is, for example, useful as a preservative, as a waterproofing agent, and as an adhesive agent in building and construction. The composition's high heat resistance is particularly useful in high-temperature applications, such as those in which the composition is applied by mopping or torching. The composition is also particularly useful in warmer climates. Articles comprising the composition may include, for example, roofing materials, such as bitumen membranes.

The invention is further illustrated by the following non-limiting examples.

EXAMPLES 1–7

Blends were prepared using poly(arylene ether) amounts of 5 to 20 weight percent, based on the total weight of the composition. The poly(arylene ether) was poly(2,6-dimethyl-1,4-phenylene ether) obtained from General Electric Co. as SA120, having an intrinsic viscosity of 0.12 deciliters/gram at 25° C. in chloroform, and an incorporated amine content of 0.15 weight percent. All bitumen samples were obtained from German and Belgian suppliers and characterized by the suppliers as having penetration grades of 60 to 220. Approximately 50 g of bitumen was placed in a round bottom flask with a dinitrogen purge. The flask was submerged in a hot oil bath at 180–240° C. and moderate stirring (about 200 rpm) was applied. Once the bitumen was hot, the milled poly(arylene ether) having an average particle size of about 50–100 micrometers was added and allowed to mix for 30–60 minutes at 180–240° C. The modified bitumen was poured out into aluminum pans and allowed to cool. Formulations were visually inspected and characterized as clumped (undesirable) or dispersed (desirable). Table 1 shows the results of each test. It was observed by tilting the bitumen samples on their sides overnight and observing the degree of movement that when the poly(arylene ether) was successfully dispersed, the resulting modified bitumen was much stiffer than the original bitumen.

TABLE 1

| Ex. No. | Penetration Grade of Bitumen | Process Temperature (° C.) | PPE Concentration (%) | Result (visual observation) |
|---|---|---|---|---|
| 1 | 60 | 180 | 10 | Clumped |
| 2 | 60 | 240 | 10 | Partially Dispersed |
| 3 | 220 | 180 | 10 | Clumped |
| 4 | 220 | 240 | 10 | Dispersed |
| 5 | 220 | 240 | 20 | Dispersed |
| 6 | 220 | 240 | 5 | Dispersed |
| 7 | 150 | 240 | 10 | Clumped |

EXAMPLES 8–14

Blends were prepared comprising a poly(arylene ether) and block copolymers poly(styrene-butadiene-styrene) (SBS) or poly(styrene-(ethylene-butylene)-styrene) (SEBS). As specified in Table 2, below, the block copolymer was added at 5–10 weight percent, and the poly(arylene ether) was added at 1–5 weight percent. The general procedure is the same as in Example 1, except that the temperature of the hot oil was kept at 190° C. and the blend was mixed for 2–3 hours. The poly(arylene ether) was poly(2,6-dimethyl-1,4-phenylene ether) obtained from General Electric Co. as SA120, as described above. The SBS was KRATON® D1101 (from Shell Chemical, now Kraton Polymers), and an antioxidant (IRGANOX® 1010; obtained from Ciba Geigy) was also added at 1% of the SBS. The SEBS was KRATON® G 1652 (from Shell Chemical). The result of the final blend based on visual observation is shown in Table 2. All blends in Table 2 used B150 bitumen. The data in Table 2 suggest that the limit of PPE solubility in these bitumen blends is between 20–25 weight percent relative to the weight of the block copolymer.

TABLE 2

| Ex. No. | Block Copolymer (%) | PPE concentration (%) | Result (visual observation) |
|---|---|---|---|
| 8 | 5 | 1 | Smooth |
| 9 | 7.5 | 2.7 | Dispersed particles visible |
| 10 | 10 | 0 | Smooth |
| 11 | 10 | 1 | Smooth |

TABLE 2-continued

| Ex. No. | Block Copolymer (%) | PPE concentration (%) | Result (visual observation) |
|---|---|---|---|
| 12 | 10 (SEBS) | 2 | Smooth |
| 13 | 10 | 2.5 | Dispersed particles visible |
| 14 | 10 | 5 | Dispersed articles visible |

EXAMPLE 15

Comparative Example 1

A blend was prepared using 10% SEBS (Kraton G 1652 from Shell) and 2% poly(arylene ether) (poly(2,6-dimethyl-1,4-phenylene ether) obtained from General Electric Co. as SA120, and 88% bitumen having a penetration grade of 200. A comparison blend was prepared without the poly(arylene ether). The B200 bitumen was heated in an oven to 190° C., then the SEBS and milled poly(arylene ether) were added. The blend stirred for 4 hours at 190° C. The system had moderate stirring and a dinitrogen blanket. Test strips were prepared and various properties were measured to show the effect of the PPE. Tests were performed according to standard procedures specified in Table 3. The data are presented in Table 3 and indicate that the presence of 2% poly(arylene ether) improved the softening point by 14° C., the flow temperature by 10° C., and the penetration by 0.08 mm. It is clear that poly(arylene ether) improves the heat properties of modified bitumen by increasing the temperature at which the blend softens and flows.

TABLE 3

| Property | Standard Test Method | C. Ex. 1 (10% SEBS) | Ex. 15 (10% SEBS + 2% PPE) |
|---|---|---|---|
| Viscosity at 180° C. (cps) | Brookfield | 265 | 312 |
| Cold Bend Temperature (° C.) | PrEN 1109 | −12 | −10 |
| Ring and Ball Softening Point (° C.) | NEN-EN 1427 | 80 | 94 |
| Penetration Point (mm) | NEN-EN 1426 | 0.57 | 0.49 |
| Flow Temperature (° C.) | PrEN 1110 | 65 | 75 |
| Contact with fire | DIN 4102, part 1 (B2) | Satisfies B2 classification | Satisfies B2 classification |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

What is claimed is:

1. A composition, comprising:
   about 0.1 weight percent to about 20 weight percent poly(arylene ether) having an intrinsic viscosity less than 0.4 deciliters/gram at 25° C. in chloroform; and bitumen.

2. The composition of claim 1, wherein the poly(arylene ether) comprises a plurality of structural units of the formula:

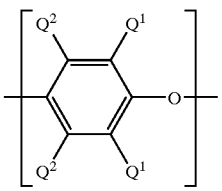

wherein for each structural unit, each $Q^1$ is independently halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_1$–$C_{12}$ halohydrocarbonoxy wherein at least two carbon atoms separate the halogen and oxygen atoms; and each $Q^2$ is independently hydrogen, halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_1$–$C_{12}$ halohydrocarbonoxy, wherein at least two carbon atoms separate the halogen and oxygen atoms.

3. The composition of claim 2, wherein the poly(arylene ether) comprises poly(2,6-dimethyl-1,4-phenylene ether).

4. The composition of claim 1, wherein the poly(arylene ether) has an intrinsic viscosity less than about 0.35 deciliters/gram, as measured at 25° C. in chloroform.

5. The composition of claim 1, wherein the poly(arylene ether) has an intrinsic viscosity less than about 0.3 deciliters/gram, as measured at 25° C. in chloroform.

6. The composition of claim 1, wherein the poly(arylene ether) has an intrinsic viscosity less than about 0.2 deciliters/gram, as measured at 25° C. in chloroform.

7. The composition of claim 1, wherein the poly(arylene ether) comprises less than about 0.5 weight percent of incorporated amine, calculated as 100 times the weight of incorporated dibutylamine divided by the total weight of the poly(arylene ether).

8. The composition of claim 1, comprising as a bitumen source a material selected from the group consisting of straight asphalts, semi-blown asphalts, blown asphalts, tars, pitches, cutback asphalts, asphalt emulsions, and mixtures comprising at least one of the foregoing materials.

9. The composition of claim 1, wherein the bitumen has a penetration grade of about 150 to about 220.

10. The composition of claim 1, wherein the bitumen has an asphaltene content less than about 12 weight percent.

11. The composition of claim 1, comprising about 1 to about 99.9 weight percent bitumen, based on the total weight of the composition.

12. The composition of claim 1, further comprising a block copolymer of an alkenyl aromatic compound and a conjugated diene.

13. The composition of claim 12, wherein the alkenyl aromatic compound has the formula:

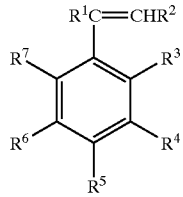

wherein $R^1$ and $R^2$ each independently represent a hydrogen atom, or a $C_1$–$C_8$ alkyl group; $R^3$ and $R^7$ each independently represent a hydrogen atom, a $C_1$–$C_8$ alkyl group, a chlorine atom, or a bromine atom; and $R^4$, $R^5$, and $R^6$ each independently represent a hydrogen atom, a $C_1$–$C_8$ alkyl group, or a $C_2$–$C_8$ alkenyl group, or $R^6$ and $R^7$ are taken together to form a naphthyl group, or $R^5$ and $R^6$ are taken together to form a naphthyl group.

14. The composition of claim 12, wherein the alkenyl aromatic compound comprises styrene.

15. The composition of claim 12, wherein the conjugated diene comprises a conjugated diene selected from the group consisting of 1,3-butadiene, 2-methyl-1,3-butadiene, 2,3-dimethyl-1,3-butadiene, 1,3-pentadiene, and mixtures comprising at least one of the foregoing conjugated dienes.

16. The composition of claim 12, wherein the block copolymer of an alkenyl aromatic compound and a conjugated diene comprises block-poly(styrene-butadiene-styrene), block-poly(styrene-(ethylene-butylene)-styrene), or a mixture comprising at least one of the foregoing block copolymers.

17. The composition of claim 12, wherein the block copolymer comprises alkenyl aromatic blocks having a total number average molecular weight of at least about 5,000 amu.

18. The composition of claim 12, comprising about 1 weight percent to about 30 weight percent of the block copolymer, based on the total weight of the composition.

19. The composition of claim 12, wherein the weight ratio of the block copolymer to the poly(arylene ether) is at least about 3:1.

20. The composition of claim 1, further comprising an additive selected from the group consisting of curing aids, activators, retarders, accelerators, processing aids, plasticizers, fillers, reinforcing agents, antioxidants, antiozonants, flame retardants, peptizing agents, coupling agents, gelling agents, and mixtures comprising at least one of the foregoing additives.

21. The composition of claim 20, comprising a filler selected from the group consisting of limestone, slate dust, talc, fly ash, carbon black, and mixtures comprising at least one of the foregoing fillers.

22. The composition of claim 1, having a ring and ball softening point according to NEN-EN 1427 of at least about 85° C.

23. The composition of claim 1, having a penetration point according to NEN-EN 1426 of less than about 0.55 mm.

24. The composition of claim 1, having a flow temperature according to PrEN 1110 of at least about 70° C.

25. A composition comprising:
 about 1 to about 3 weight percent of a poly(arylene ether) having an intrinsic viscosity less than 0.4 deciliters/gram at 25° C. in chloroform;
 about 5 to about 15 weight percent of a block copolymer of an alkenyl aromatic compound and a conjugated diene; and
 about 50 to about 94 weight percent bitumen;
 wherein all weight percents are based on the total weight of the composition.

26. A composition comprising:
 about 1 to about 3 weight percent of a poly(arylene ether) comprising poly(2,6-dimethyl-1,4-phenylene ether) having an intrinsic viscosity less than about 0.2 deciliters/gram at 25° C. in chloroform;
 about 5 to about 15 weight percent of a block copolymer of an alkenyl aromatic compound and a conjugated diene comprising block-poly(styrene-butadienestyrene), block-poly(styrene-(ethylene-butylene)-styrene), or a mixture comprising at least one of the foregoing block copolymers; and about 50 to about 94 weight percent bitumen;

wherein all weight percents are based on the total weight of the composition.

27. A method of preparing a composition, comprising:

blending a bitumen and a poly(arylene ether) having an intrinsic viscosity less than 0.4 deciliters/gram at 25° C. in chloroform to form a mixture wherein the poly(arylene ether) is in the form of a powder having an average particle not greater than about 200 micrometers.

28. The method of claim 27, wherein blending is conducted at a temperature of at least about 210° C.

29. A method of preparing a poly(arylene ether)-containing composition, comprising:

blending a poly(arylene ether) and a block copolymer of an alkenyl aromatic compound and a conjugated diene to form a first mixture; and blending the first mixture and bitumen to form a second mixture wherein the poly(arylene ether) is in the form of a powder having an average particle size not greater than about 200 micrometers.

* * * * *

UNITED STATES PATENT AND TRADEMARK OFFICE
CERTIFICATE OF CORRECTION

PATENT NO. : 6,552,105 B2
DATED : April 22, 2003
INVENTOR(S) : Adrianus J.F.M. Braat et al.

It is certified that error appears in the above-identified patent and that said Letters Patent is hereby corrected as shown below:

<u>Column 3,</u>
Line 10, after "using", delete "dibutylarnine" and insert -- dibutylamine --;
Line 30, before "for", delete "Method" and insert -- Methods --.

<u>Column 6,</u>
Line 39, after "be", delete "preferably" and insert -- preferable --.

<u>Column 8,</u>
Line 8, (Table 2), after "Dispersed", delete "articles" and insert -- particles --.

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,552,105 B2 Page 1 of 1
APPLICATION NO. : 09/782584
DATED : April 22, 2003
INVENTOR(S) : Adrianus J.F.M. Braat et al.

It is certified that error appears in the above-identified patent and that said Letters Patent is hereby corrected as shown below:

Title Page,
Item (73) Assignee, delete "Pittsfield, MA" and insert therefor --Schenectady, NY--.

Signed and Sealed this

Twenty-fourth Day of October, 2006

JON W. DUDAS
*Director of the United States Patent and Trademark Office*